United States Patent [19]

Kawata et al.

[11] Patent Number: 5,512,399

[45] Date of Patent: Apr. 30, 1996

[54] ORGANIC PHOTO SENSITIVE MEMBER FOR ELECTROPHOTOGRAPHY

[75] Inventors: Noriaki Kawata; Kiyoshi Hikima, both of Nagano, Japan

[73] Assignee: Fuji Electric Co., Ltd., Kawasaki, Japan

[21] Appl. No.: 305,907

[22] Filed: Sep. 14, 1994

[30] Foreign Application Priority Data

Sep. 21, 1993 [JP] Japan .................. 5-233974

[51] Int. Cl.⁶ .................................... G03G 5/10
[52] U.S. Cl. .................................... 430/69; 430/127
[58] Field of Search .................................... 430/69, 127

[56] References Cited

U.S. PATENT DOCUMENTS

| | | | |
|---|---|---|---|
| 4,416,963 | 11/1983 | Takimoto et al. | 430/69 |
| 4,442,160 | 4/1984 | Toba et al. | 430/69 |
| 4,645,327 | 2/1987 | Kiyoshi et al. | |
| 5,021,109 | 6/1991 | Petropoulos et al. | 430/127 |

FOREIGN PATENT DOCUMENTS

| | | |
|---|---|---|
| 3935140 | 5/1991 | Germany . |
| 58-30764 | 2/1983 | Japan . |
| 58-23079 | 2/1983 | Japan . |
| 58-63945 | 4/1983 | Japan . |
| 63-54149 | 4/1988 | Japan . |
| 2-17026 | 4/1990 | Japan . |

OTHER PUBLICATIONS

*Chemical Abstracts* 102:36716 (1984).

*Primary Examiner*—Christopher D. Rodee
*Attorney, Agent, or Firm*—Kanesaka & Takeuchi

[57] ABSTRACT

An organic photosensitive member for electrophotography is formed of a cylindrical supporting member and an organic photosensitive layer on an outer surface of the supporting member. The supporting member is formed of a material of $10^4$ ohm·cm in volume resistivity containing a cross-linking type polyphenylenesulfide resin as a main component, and a highly conductive carbon black of $10^1$ ohm·cm or less in volume resistivity. Thus, the supporting member has a light weight with good productivity and good chemical and thermal resistance. The supporting member can be made with dimensional accuracy despite its thin and long shape, and also has a uniform surface roughness, stable surface quality and good adhesion.

9 Claims, 3 Drawing Sheets 5,512,399

ORGANIC PHOTO SENSITIVE MEMBER FOR ELECTROPHOTOGRAPHY

BACKGROUND OF THE INVENTION AND RELATED ART STATEMENT

The present invention relates to an organic photosensitive member for electrophotography, and in particular, to a conductive cylindrical supporting member therefor.

A photo sensitive member for electrophotography that is used for an electrophotography device, such as a copier or printer to which electrophotography technology is applied, comprises a conductive supporting member, and a sensitive layer provided thereon and formed of an organic material containing an organic photoconductive material. The conductive supporting member is usually cylindrical for convenience of a design of the device, and the sensitive layer is coated on the outer surface thereof.

As conventional materials for the cylindrical supporting member, aluminum or its alloy having a relatively light weight and a good machinability has been used.

However, Japanese Patent Publication (KOKOKU) No. 2-17026 discloses a supporting member manufactured by an injection molding method using a material comprising a polyphenylenesulfide resin (simply referred to as PPS herein below) as a main component. The supporting member has a light weight and good chemical and thermal resistance, and is not oxidized or otherwise deteriorated in air, which is thus preferable for an organic sensitive member.

Also, Japanese Utility Model Publication (KOKAI) No. 63-54149 discloses a supporting member formed of a phenol resin, which may contain a carbon black.

However, the supporting members comprising aluminum or its alloy require individually high accurate machining to obtain a rigid dimensional accuracy (±50 micrometer or less in roundness and ±40 micrometer in accuracy of diameter) and a preferable surface roughness (0.5–1.2 micrometer at Maximum height Rmax). Also, it requires individual machining wherein a flange for rotatably driving the sensitive member is formed, and has a disadvantage that the surface is oxidized or deteriorated due to the effect of moisture or oxygen in air. Thus, it requires to prevent deterioration, for example, formation of an anodic oxidized coat on the surface. Accordingly, it requires many steps, and costs in manufacture process.

In addition, the supporting members composed of a PPS resin as a main component have the following disadvantages. Since the volume resistivity of a PPS resin is high, that is, usually $10^{10}$ to $10^{13}$ ohm·cm, a carbon black is added to the PPS resin to provide conductivity. In the market, recently, demands on image quality and printing characteristics are getting severe. Studies for conductivity of the supporting members required to obtain good image quality and printing characteristics in practical use have revealed that the volume resistivity of the supporting member should be $10^4$ ohm·cm or less, and that if the volume resistivity is higher than $10^5$ ohm·cm, the removal of electric charges from the supporting member when the sensitive member is exposed or static electricity is eliminated from the sensitive member becomes bad, resulting in an increase in residual potential and thereby preventing good images or printed characters.

The volume resistivity of furnace carbon, which is usually used as a conductive carbon black, is 1 to 10 ohm·cm, so that more than 20 wt. % carbon black must be added to provide the supporting member with a volume resistivity of $10^4$ ohm·cm. However, addition of such a large quantity of carbon black increases the viscosity of the material, so that it is difficult to make it by injection-molding. Recently, a supporting member with a small diameter (about 30 mm or less in an outer diameter), a small thickness (about 3 mm or less) and a large length (several hundred mm) have been demanded, but it is very difficult to form by injection-molding.

In addition, such supporting members have a reduced mechanical strength. Thinner and longer supporting members with dimensional accuracy are more difficult to provide. The supporting members comprising a material formed of an ordinary linear-type PPS resin as a main component are affected by a slight deformation that is caused by a solution of coating liquid and heating during coating to form an organic material layer on the supporting body, so that it is difficult to obtain dimensional accuracy required for the supporting member. In addition, good chemical resistance of a PPS resin prevents the adhesion of an organic material layer to the surface of the resin during coating formation, causing frequent peeling of the sensitive layer during the use of the sensitive member, thereby resulting in a short effective life.

The present invention has been made in view of the above points, and it is a first object of the invention to provide an organic sensitive member with a cylindrical supporting member, which has a light weight, a preferable conductivity, and good chemical and thermal resistance, which can maintain dimensional accuracy despite its thin and long shape, and which is not oxidized or otherwise deteriorated in air to maintain a stable quality.

It is a second object of the invention to provide an organic sensitive member with a cylindrical supporting member that has an adequate and uniform surface roughness.

It is a third object of the invention to provide an organic sensitive member with a cylindrical supporting member that has a mechanical strength large enough to prevent deformation despite its thin and long shape.

It is a fourth object of the invention to provide an organic sensitive member with a cylindrical supporting member to which an organic material layer can adhere sufficiently during coating formation.

It is a fifth object of the invention to provide an efficient manufacturing method of the cylindrical supporting members, which has a small thickness and diameter and a large length, as described in the first, second and third objects.

SUMMARY OF THE INVENTION

According to the invention, the first object is achieved by providing an organic sensitive member, wherein an organic sensitive layer is provided on a cylindrical supporting member formed of a material of $10^4$ ohm·cm or less in volume resistivity, the material being formed by blending a cross-linking type or cross-linked PPS resin as a main component with a highly conductive carbon black of $10^{-1}$ ohm·cm or less in volume resistivity.

The second object is achieved by providing a cylindrical supporting member, wherein the average particle diameter of a carbon black contained therein is 20 to 50 nm.

When a carbon black is added to the supporting member, a carbon black dispersant may be preferably added simultaneously to uniformly disperse the carbon black in the material for the supporting member. The dispersant may be a calcium carbonate or clay.

The third object can be achieved by providing a cylindrical supporting member containing glass fibers as a reinforcement.

As described above, the material for the supporting member is a cross-linking type PPS resin to which a carbon black, a carbon black dispersant, and glass fibers are added. The amount of the cross-linking type PPS resin should be at least 40 wt. % so that the resin can act favorably for the supporting member.

The fourth object can be achieved by irradiating the surface of the cylindrical supporting member with ultraviolet rays with 180 to 255 nm in wavelength or inducing corona discharge thereon.

The fifth object can be achieved by injection-molding a material of $10^4$ ohm·cm in volume resistivity formed by blending a cross-linking type PPS resin as a main component with a highly conductive carbon black of $10^{-1}$ ohm·cm or less, or the above material wherein the average particle diameter of the carbon black is 20 to 50 nm or to which glass fibers are added.

A metal mold for the injection-molding is preferably heated within a range of 120° to 150° C., and the molding material is preferably heated within a range of 280° to 330° C. Filling of the injection-molding material is completed in preferably 0.5 to 2.5 second.

It is also preferable to use a mold, wherein a core mold is finished to have a surface roughness of 1 micro meter or less at the maximum height (Rmax) and a draft angle of 0.15 to 0.25 degree on one side. The inner surface of a cavity mold does not have a draft angle, and is electro-formed with a nickel alloy to be finished to have a surface roughness of 1 micro meter or less at the maximum height (Rmax). And the inner surface has, at the inside of the end face contacting a fixed mold, a step section through which a material is filled into a cavity by using a side gate method. Also, the circumference of the cavity mold is sectioned into at least three at the end face of the fixed mold contacting the cavity mold, and a spring knock is provided in each section to ensure that when the mold is opened, the injection-molded product remains in the cavity mold due to the effect of the spring knock.

Table 1 shows the characteristics of the cylindrical molded products made of both cross-linking type and linear-type PPS resins relative to chemical resistance evaluated in terms of changes in mass (%) after immersion in acetone, methylene chloride and dichloroethane respectively for 24 hours, and thermal resistance evaluated in terms of changes (%) in diametral and longitudinal dimensions after heating at 120° C. for 48 hours.

TABLE 1

| Properties | Linear-type PPS resin | Cross-linking type PPS resin |
| --- | --- | --- |
| Chemical resistance (changes in mass (%) after immersion for 24 hours) | | |
| acetone | +0.05 | 0 |
| methylene chloride | +12.42 | +0.13 |
| dichloroethane | +3.40 | 0 |

TABLE 1-continued

| Properties | Linear-type PPS resin | Cross-linking type PPS resin |
| --- | --- | --- |
| Thermal resistance (changes in dimensions (%) after heating at 120 °C. for 48 hours) | | |
| diametral direction | 0.67 | −0.01 |
| longitudinal direction | −1.20 | 0 |

As is apparent from Table 1, the cross-linking type PPS resin is superior to the linear-type PPS resin in terms of both chemical and thermal resistances. The formation of a supporting member with a cross-linking type PPS resin as a main component reduces thermal deformation of the supporting member or swelling caused by a solution of a coating liquid during the coating formation of the organic material layer, such as a sensitive layer, and also reduces deformation of the supporting member. Thus, it is possible to provide practically sufficient dimensional accuracy even for the sensitive member using a supporting member with a small thickness and diameter and a large length.

A highly conductive carbon black of $10^{-1}$ ohm·cm in volume resistivity, for example a highly conductive carbon black or a more highly conductive channel black, is added into a material containing the cross-linking type PPS resin as a main component to apply conductivity to the material, so that the quantity of the carbon black to be added to the supporting member to reduce its volume resistivity to $10^4$ ohm·cm or less can be reduced to 20 wt % or less. And, it is possible to keep the viscosity of the material for the supporting member enough to allow the supporting member to be injection-molded despite its small diameter and thickness and large length, for example, melt flow rate (MFR) can be maintained within a range of 20 g/10 min. to 50 g/10 min. at 300° C.

Of course, the carbon black is preferably dispersed uniformly in the material for the supporting member. For this purpose, a dispersant is desirably added to the material, wherein the applicable dispersants include calcium carbonate and clay. Although the quantity of the dispersant to be added depends on the quantity of the carbon black to be added, it should be 10 to 30 wt. % of the material for the supporting member. Less than 10 wt. % of the dispersant has no effect, while more than 30 wt. % of the dispersant is not preferable due to its adverse effect on the conductivity of the material.

Although the surface roughness of the supporting member depends upon the surface roughness of the inner surface of the cavity mold of the metal mold, it is affected greatly by the particle size of the carbon black. A carbon black with 20 to 50 nm in an average particle diameter enables the surface roughness of the supporting member to be within a range of 0.5 to 1.2 micro meter at Rmax.

The addition of glass fibers to the supporting member compensates for a decrease in mechanical strength caused by the addition of the carbon black, and it is possible to obtain strength of $0.49 \times 10^8$ N/m2 or more required for the supporting member about 1 mm in thickness. The glass fiber preferably has a diameter of 20 micro meter and a length of 3 mm. Although the quantity of the glass fibers to be added depends on the quantity of the carbon black to be added, it should be 10 to 30 wt. % of the material for the supporting member. Less than 10 wt. % of the glass fibers have no effect, while more than 30 wt. % of the glass fibers are not preferable due to its adverse effect on the conductivity of the material and the surface roughness of the supporting member.

As described above, the supporting member is a crosslinking type PPS resin, to which a carbon black, a carbon black dispersant and glass fibers are added, wherein at least 40 wt. % or more of the resin is used to effectively utilize the resin without losing its character.

A disadvantage of the PPS resin is low adhesion. In the electronics and automobile fields in which PPS resins are used as engineering plastics, a method for irradiating the surface with ultraviolet rays or inducing corona discharge thereon to modify the surface to improve adhesion have been known (The Adhesion Society of Japan 31st Annual Convention (June, 1993): Improvement of PPS Adhesion; Journal of the Adhesion Society of Japan Vol. 29, No. 4 (1993): Improvement of Surfaces Using Ultraviolet Rays).

However, it has not been known whether or not the method can be used effectively without degrading the function of the supporting member if a cross-linking type PPS resin is used as a functional material for the supporting material of the sensitive member. The inventors have discovered that irradiation with ultraviolet rays of 180 to 255 nm in wavelength causes ozone to be generated from oxygen in air due to ultraviolet energy to cut molecular chains on the utmost surface of the cross-linking type PPS resin and to generate -OH and -COOH groups due to the additional effect of moisture in air to thereby activate the surface. Thus, the wettability and adhesion on the surface are greatly improved without losing the necessary functions as the supporting member. Also, in the corona discharge treatment, ozone is generated by the corona discharge energy to produce effects similar to those in irradiation with ultraviolet rays.

The supporting member for the sensitive member in accordance with the invention is made by injection-molding a material containing a cross-linking type PPS resin as a main component, to which a carbon black, a carbon black dispersant, and glass fibers are added. The supporting member with required shape and surface roughness can be manufactured accurately and efficiently by integrally molding by a metal mold with an adequate structure under adequate molding conditions. This obviates the need of individual surface-roughness-machining and other machining processes required when an aluminum alloy is used to manufacture a supporting member.

The metal mold is heated within a range of 120° to 150° C. during the injection-molding, the molding material is heated within a range of 280° to 330° C., and sufficient injection pressure is applied to fill the material in preferably 0.5 to 2.5 second in the mold. In this case, if a supporting member with a thickness less than 3 mm and a length of several hundred millimeters is injection molded, the filling of the material is completed before the resin starts to solidify within the cavity (material-filled section) to provide a well-shaped supporting member, and the resin is crystallized sufficiently to enable the cross-linking type PPS resin to function effectively.

Next, the metal mold used to manufacture the supporting member in accordance with the invention is described with reference to the drawings. FIGS. 3 to 5 are partially sectional views describing an embodiment of the metal mold in accordance with the invention. FIG. 3 shows a closed condition in which an end face of a cavity mold 6 contacts firmly to an end face of a fixed mold 8, wherein reference numeral 7 designates a core mold and reference numeral 9 is a cavity into which a molding material is filled and molded. FIG. 4 shows an opening condition, in which the cavity mold 6 and the fixed mold 8 are separated after molding. Reference numeral 14 designates a molded product. The core mold 7 is fitted in the fixed mold 8 and fixed thereto. FIG. 5 is a partially enlarged sectional view of a spring knock 11 and its periphery shown in FIG. 3. Reference numeral 12 designates a spring, while reference numeral 13 designates a knockout pin.

A step section 10 is formed at an inside of the end face of the cavity mold 6 contacting the fixed mold 8. (h) in the step section 10 shown in FIG. 5 should preferably be 1 to 3 mm and (w) should be 2 to 5 mm. In the closed condition shown in FIG. 3, when a molding material is filled in the cavity 9 through the step section 10 using a side gate method, the material fills the step section 10 and then the thin cylinder-like cavity 9, so that the cavity 9 is filled quickly, and circumferentially uniformly up to the tip of the cavity 9 without producing defects, such as a weld line. A gas vent is preferably provided at the tip of the cavity 9, and if desired, vacuum venting is made to fill the molding material quickly in preferably 0.5 to 2.5 second. The inside of the cavity mold 6 is electro-formed with a nickel alloy to allow the molded product to be molded and released properly, and is finished to have surface roughness of 1 micro meter or less at the maximum height (Rmax). The cavity mold 6 with such a surface condition is used, and the material is filled in the cavity 9 at a sufficient injection pressure and solidified. Thus, it is possible to obtain an injection-molded supporting member whose surface roughness is 1 micro meter or less at the maximum height (Rmax).

A uniform outer diameter is required for the sensitive member, and a draft angle must not be formed at the outer surface of the molded product. Such molded products, in particular, those with a small thickness, are difficult to be released from the cavity mold 6 without damaging the surface. Thus, the surface of the core mold 7 is finished to be smooth so that its surface roughness is 1 micro meter or less at the maximum height (Rmax), and the draft angle within a range of 0.15 to 0.25 degree is provided on one side. The fixed mold is provided with at least three spring knocks 11, each formed of a knockout pin 13 and a spring 12 at its end face opposite to the circumference of the end face of the cavity mold 6.

In this structure, the spring 12 compressed during closing of the molds as shown in FIG. 5 opens and extends upon opening, thereby causing the tip of the knockout pin 13 to protrude from the end face of the fixed mold 8 as shown in FIG. 4. The length of the knockout pin protruding from the end face is (m) shown in FIG. 5. Thus, when the fixed mold 8 is separated from the cavity mold 6 and opened after molding, the tip of the knockout pin 13 continuously pushes the end faces of the cavity mold 6 and the molded product until the two molds 6 and 8 are separated by the distance equal to the length (m). The cavity mold 6 and the molded product 14 thus move integrally, and after opening, the molded product 14 is detached from the core mold 7 and remains fixed to the cavity mold 6, as shown in FIG. 4.

Since the core mold 7 has the draft angle and its surface is finished to be smooth, the core mold 7 can be pulled out smoothly from the molded product 14. Once the core mold has been pulled out, the molded product 14 contracts diametrally, allowing the molded product 14 to be, for example, knocked out from the cavity mold 6 without damaging its surface. If the draft angle of the core mold 7 is less than 0.15 degree on one side, the core mold is difficult to be removed, and if the draft angle is more than 0.25 degree on one side, the thickness of the thinner end of the supporting member, which is a molded product, will be too small to carry out molding in case the supporting member is about 3 mm or less in thickness. For example, when the draft angle is 0.25 degree on one side, in a supporting member of 30 mm in the outer diameter, 300 mm in length and 1.5 to 3 mm in thickness, if the thickness of the thicker end is 1.5 to 3 mm, the thickness of the thinner end is 0.3 to 0.6 mm, to thereby make the molding very difficult. The draft angle should thus be within a range of 0.15 to 0.25 degree on one side.

FIG. 6 is a perspective view illustrating a molded product removed from the metal molds, wherein a ring-like projection 15 is formed at one end of the cylindrical supporting member 1 so as to correspond to the step section 10 of the cavity mold 6. Reference numeral 16 designates a side gate.

DETAILED DESCRIPTION OF A PREFERRED EMBODIMENT

Figure 1A:
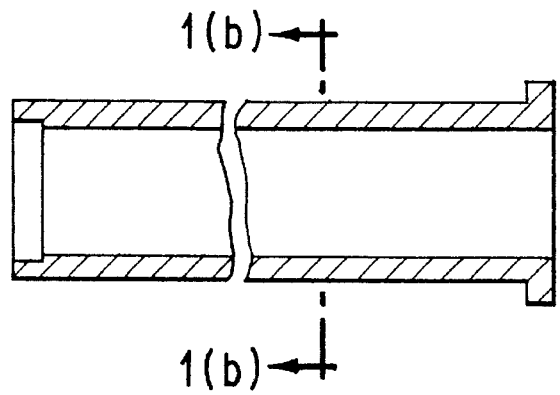
FIG. 1(a) is a longitudinal section view of an embodiment of a supporting member in accordance with the invention.
Figure 1B:
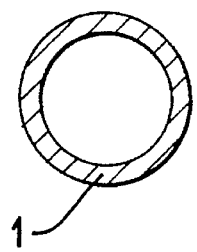
FIG. 1(b) is a cross-sectional view taken along a line 1(b)–1(b) of FIG. 1(a)
Figure 2:
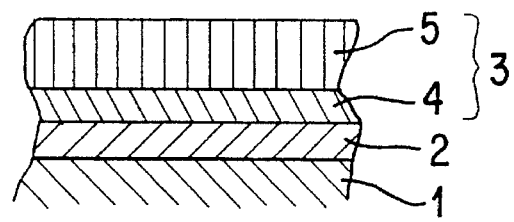
FIG. 2 is a typical section view of an embodiment of a sensitive member in accordance with the invention.

FIG. 1(a) is a longitudinal section view of an embodiment of a supporting member 1 for a sensitive member in accordance with the invention, and FIG. 1(b) is a section view taken along a line 1(b)–1(b) of FIG. 1(a). FIG. 2 is a typical section view illustrating the structure of layers of an embodiment of the sensitive member. In the drawings, a sensitive layer 3 is formed by laminating an electric charge generation layer 4 and an electric charge transport layer 5 in this order on the supporting body 1 shown in FIG. 1 through an under-layer 2. The under-layer 2 is not always necessary but is provided when needed.

EMBODIMENT 1

Figure 3:
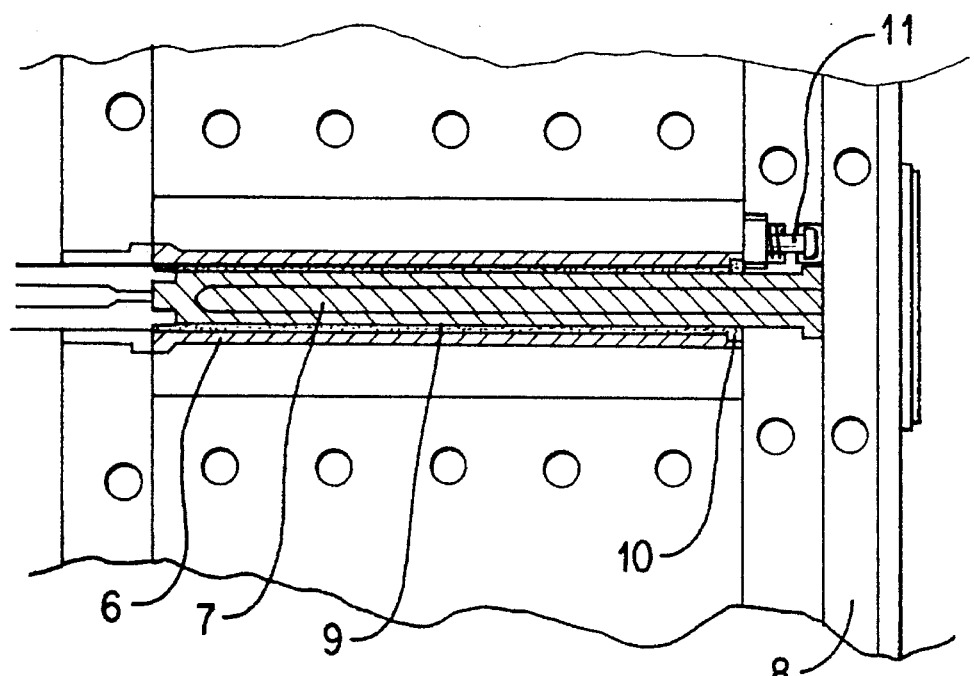
FIG. 3 is a partial section view of metal molds in a closing condition in accordance with the invention.
Figure 4:
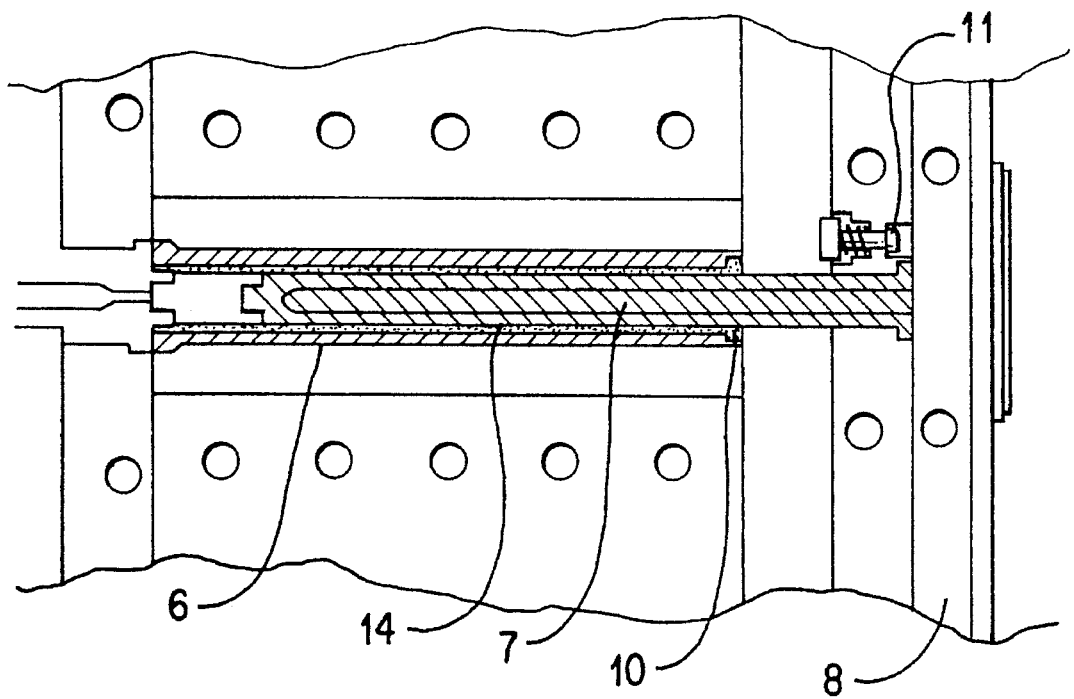
FIG. 4 is a partial section view of the metal molds in an opening condition in accordance with the invention.
Figure 5:
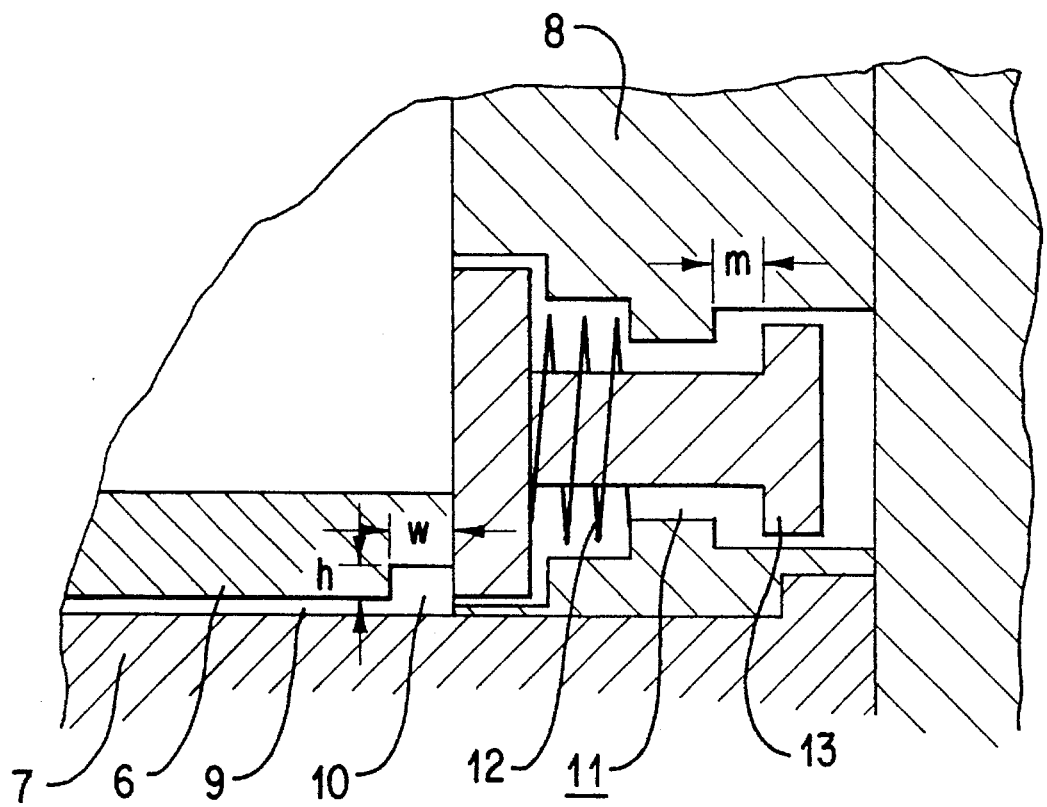
FIG. 5 is a partially enlarged section view of a spring knock section and its periphery shown in FIG. 3.
Figure 6:
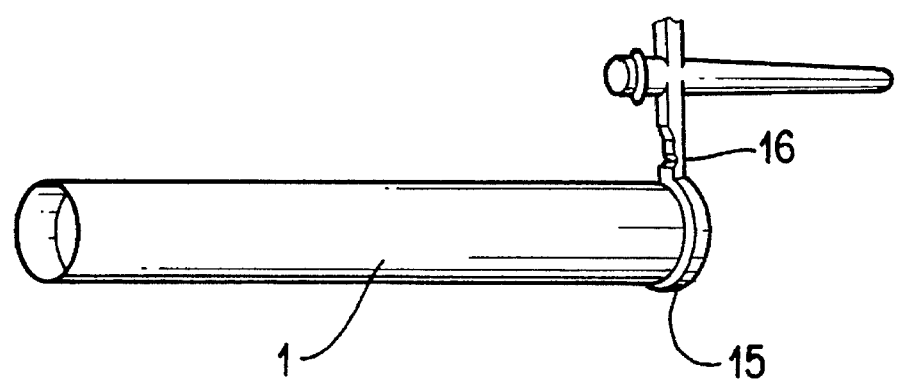
FIG. 6 is a perspective view illustrating a molded product removed from the metal molds.

Using the materials 1-1 to 1-4 with the compositions shown in Table 2 and a metal mold shown in FIGS. 3 to 5, supporting members Nos. 1 to 3 were formed by injection-molding under the same molding conditions, while a supporting member No. 4 was formed by injection-molding at a different metal mold temperature using a material 1-4 formed of a linear-type PPS resin. The injection-molding was carried out using a draft angle of about 0.23 degree on one side to obtain supporting members with an outer diameter of 30 mm, a length of 260.5 mm, and an inner diameter of 28.5 mm for the thinner end and 26.5 mm for the thicker end.

TABLE 2

| Raw material | Raw material brand | Compounding ratio (wt %) Material | | | |
|---|---|---|---|---|---|
| | | 1-1 | 1-2 | 1-3 | 1-4 |
| Cross-linking type PPS resin | Toray PPS M2900 (MFR: 600) | 60 | — | — | — |
| | Toray PPS M3910 (MFR: 2000) | — | 50 | 50 | — |
| Linear-type PPS resin | | — | — | — | 50 |
| Carbon black | Cabot Furnace Carbon XC 72 (particle size: 30 nm | 15 | — | — | — |
| | Cabot Furnace Carbon BP-480 (particle size: 30 nm) | — | 20 | 10 | 20 |
| Clay | Tsuchiya Kaoline SATINTONES | 10 | 15 | 25 | 15 |
| Glass fibers | Nippon Sheet Glass RES 03-TP76 (diameter: about 20 micro meter; length: about 3 mm) | 15 | 15 | 15 | 15 |

TABLE 3

| Supporting member | 1-1 | 1-2 | 1-3 | 1-4 |
|---|---|---|---|---|
| Supporting member material | | Material | | |
| | 1-1 | 1-2 | 1-3 | 1-4 |
| Cylinder temperature (°C.) | | | | |
| rear | 280 | 280 | 280 | 280 |
| middle | 290 | 290 | 290 | 290 |
| front | 300 | 300 | 300 | 300 |
| Nozzle temperature (°C.) | 310 | 310 | 310 | 300 |
| Metal mold temperature (°C.) | 150 | 150 | 150 | 120 |
| Injection pressure ($\times 10^8$ N/m$^2$) | 1.62 | 1.62 | 1.62 | 1.62 |
| Filling time (sec) | 0.1 | 0.1 | 0.1 | 0.1 |
| Cooling time (sec) | 30 | 30 | 30 | 30 |

The following sensitive layers were formed on these supporting members under the same conditions to produce sensitive members. That is, a coating liquid with 5 wt.pts. alcohol-soluble polyamide resin (manufactured by Toray Co., Ltd.; Amilan CM 8000) solved in 95 wt. pts. of methanol was coated on a supporting member by a dipping method and then dried at 120° C. for 15 minutes to. form an under-layer of 0.5 micro meter in thickness. A coating liquid formed of 10 wt.pts. of X-type non-metal phthalocyanine (manufactured by Dainippon Ink and Chemical Inc.; FAST-GEN BLUE 8120), 10 wt.pts. of vinyl chloride resin (manufactured by Nippon Zeon Co., Ltd.; MR-110), 686 wt.pts. of dichloromethane and 294 wt.pts. of 1,2-dichloroethane was dispersed in a mixer for one hour and was further dispersed by a supersonic dispersing machine for 30 minutes. The coating liquid was coated on the under-layer by a dipping method and then dried at 80° C. for 30 minutes to form an electric charge generation layer of approximately 0.5 micro meter in film thickness.

A coating liquid consisting of 100 wt.pts. of hydrazone compound (manufactured by Fuji Electric Co., Ltd.) shown in the formula (1) below, 100 wt.pts. of polycarbonate resin (manufactured by Mitsubishi Gas Chemical Co., Ltd.; Iupilon PCZ), and 800 wt.pts. of dichloromethane was coated on the electric charge generation layer by a dipping method, and then dried at 90° C. for one hour to form an electric charge transport layer of 20 micro meter in thickness, thereby producing a sensitive member.

Formula I

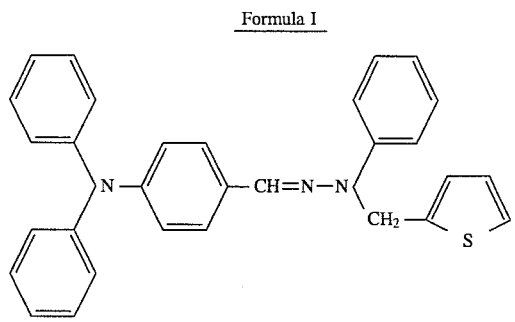

Table 4 shows MFR at 300° C. volume resistivity, injection-moldability, mechanical strength, chemical resistance (evaluated in terms of changes in mass during immersion in methylene chloride for two hours), surface roughness (at the maximum height Rmax), outer diameter accuracy, change in dimensions measured after heating at 120° C. for 48 hours, potential retaining rate $V_{k5}$ measured after 5 seconds after charging in a dark place, residual potential Vr measured after irradiation of monochromatic light of 780 nm in wavelength for 10 micro J/cm$^2$, and printing characteristics evaluated by installing the sensitive member in a commercially available semiconductor laser printer of each sensitive member.

TABLE 4

| Sensitive member No. | 1-1 | 1-2 | 1-3 | 1-4 |
|---|---|---|---|---|
| Supporting member No. | 1-1 | 1-2 | 1-3 | 1-4 |
| MFR (g/10 min.) | 30 | 40 | 30 | 40 |
| Volume resistivity (ohm · cm) | $2 \times 10^3$ | $3 \times 10^2$ | $10^6$ | $3 \times 10^2$ |
| Injection moldability | Good | Good | Good | Nearly Good |
| Mechanical strength ($\times 10^8$ N/m$^2$) | 0.68 | 0.68 | 0.74 | 0.78 |
| Chemical resistance (%) | 10.5 | 10.1 | 10.1 | +12.4 |
| Surface roughness Rmax (micro meter) | 0.9 | 0.8 | 0.8 | 0.8 |
| Outer diameter accuracy (+/− mm) | 0.05 | 0.03 | 0.03 | 0.05 |
| Dimensional change rate (%) | 0 | 0 | 0 | −0.7 |
| $V_{k5}$(%) | 90 | 92 | 93 | 92 |
| Vr(v) | 31 | 34 | 60 | 35 |
| Printing characteristics | Good | Good | Bad | Nearly Good |

As can be seen from Table 4, the supporting member 1-4 using the material 1-4 formed of a linear-type PPS resin as a main component has inferior in chemical resistance than that of the supporting members 1-1, 1-2 and 1-3 using the materials 1-1, 1-2 and 1-3 respectively formed of a cross-linking type PPS resin as a main component, while it has a larger dimensional change rate than that of the supporting members 1-1, 1-2 and 1-3. In addition, the sensitive member 1-3 using the supporting member 1-3 with a high volume resistivity of 10$^6$ ohm·cm has bad printing characteristics. It is obvious that the supporting members formed of the material formed of the cross-linking type PPS resin as a main component and having volume resistivity of 10$^4$ ohm·cm or less can provide good effects.

EMBODIMENT 2

An ultraviolet ray irradiation device (SUV200NS) manufactured by Sen Engineering Co., Ltd. was used to irradiate onto the surface of the supporting member 1-1 described in Embodiment 1 with ultraviolet rays of 184.9 and 253.7 nm in wavelength from a 200-W low pressure mercury lamp, while keeping a distance of 20 mm from the supporting member. The supporting member irradiated for 10 seconds was referred to as 2-1, while the supporting member irradiated for 20 seconds was referred to as 2-2.

In addition, corona discharge was induced on the surface of the supporting member 1-1 while it was being rotated (discharge voltage: about 10 kv; gap between a discharge electrode and the supporting member: 2 to 3 mm; and discharge time: 30 seconds). This supporting member was referred to as 2-3.

For comparison, the supporting member 1-1 on which ultraviolet ray irradiation and corona discharge were not induced was referred to as 2-4.

The contact angle of the surface of these supporting members with respect to pure water was determined, and cross-cut adhesion tests (JIS K5400 8.5.1) were conducted to evaluate adhesion.

The supporting members were used to produce sensitive members 2-1, 2-2, 2-3, and 2-4 as in Embodiment 1. The sensitive members were then installed in a commercially available semiconductor laser printers to evaluate the continuous printing life, that is, when the sensitive layers start separation from the supporting members.

Table 5 shows the results.

TABLE 5

| Sensitive member No. | 2-1 | 2-2 | 2-3 | 2-4 |
|---|---|---|---|---|
| Supporting member No. | 2-1 | 2-2 | 2-3 | 2-4 |
| Surface treatment | | | | |
| ultraviolet ray irradiation (second) | 10 | 20 | | |
| corona discharge (second) | | | 30 | |
| Contact angle (degree) | 32 | 0 | 0 | 78 |
| Cross-cut adhesion test (separations/100) | 85/100 | 0/100 | 0/100 | 100/100 |
| continuous printing life (times) | 50,000 | 100,000 | 100,000 | 5,000 |

Table 5 clearly shows that the sensitive members 2-1 and 2-2 using the supporting members 2-1 and 2-2 irradiated with ultraviolet rays and the sensitive member 2-3 using the supporting member 2-3 on which corona discharge was induced were better in adhesion and continuous printing life than the sensitive member 2-4 using the supporting member 2-4 on which no treatment was made. For irradiation with ultraviolet rays from a 200-W low pressure mercury lamp, the results were particularly good when the irradiation time was 20 seconds. It can thus be estimated that the irradiation time is preferably 15 to 25 seconds.

EMBODIMENT 3

The material 1-3 in Table 2 and the metal mold in FIGS. 3 to 5 were used to carry out injection-molding at various metal mold temperatures as shown in Table 6 to produce supporting members 3-1, 3-2 and 3-3. The nozzle temperature was somewhat changed along with the variation of the metal mold temperature. For the supporting member 3-3, an increase in metal mold temperature results in a shorter material-filling time. Among the supporting members formed, the supporting member 3-3 was inadequate for practical use due to many burrs. The supporting members 3-1 and 3-2 were then used to produce sensitive members 3-1 and 3-2 as in Embodiment 1 to determine the potential retaining rate $V_{k5}$, residual potential Vr, and printing characteristics. Table 7 shows the results.

TABLE 6

| Supporting member No. | 3-1 | 3-2 | 3-3 |
|---|---|---|---|
| Cylinder temperature (°C.) | | | |
| rear | 280 | 280 | 280 |
| middle | 290 | 290 | 290 |
| front | 300 | 300 | 300 |
| Nozzle temperature (°C.) | 310 | 300 | 319 |
| Metal mold temperature (°C.) | 150 | 100 | 170 |
| Injection pressure (× $10^8$ N/m²) | 1.62 | 1.62 | 1.57 |
| Filling time (second) | 0.1 | 1.0 | 0.04 |
| Cooling time (second) | 30 | 30 | 30 |

TABLE 7

| Sensitive member No. | 3-1 | 3-2 |
|---|---|---|
| $V_{kS}$ (%) | 92 | 93 |
| Vr (v) | 34 | 55 |
| Printing characteristics | Good | Bad |

As is apparent from Tables 6 and 7, good supporting members can not be obtained unless adequate injection-molding conditions are set even if the same material is used. Good results can be obtained when the metal mold temperature is 150° C., while the printing is bad when the temperature is 100° C. and many burrs are formed when the temperature is 170° C. It can be estimated that the metal mold temperatures is preferably over 100° C. and less than 170° C., and more preferably, within a range of about 120° to about 160° C.

In the above structure, the invention has the following advantages.

The cylindrical supporting member is formed of a material having volume resistivity of less than $10^4$ ohm·cm by blending a cross-linking type PPS resin as a main component with a highly conductive carbon black of less than $10^{-1}$ ohm·cm. Thus, the organic photosensitive member with the cylindrical supporting member has a light weight, preferable conductivity, and good chemical and thermal resistance, and can effectively maintain dimensional accuracy despite its thin and long shape. Also, the cylindrical supporting member is not deteriorated by oxidation in air, thereby eliminating the need of a special treatment for surface stabilization.

Blending with a carbon black of 20 to 50 nm in an average particle diameter serves to provide an organic photosensitive member with a cylindrical supporting member having a uniform surface roughness within a range of 0.5 to 1.2 micro meters at Rmax. When the carbon black is added to the supporting member, a carbon black dispersant can preferably be added together to uniformly add the carbon black, thereby making the supporting member homogeneous and the surface roughness uniform.

The addition of glass fibers serves to provide an organic photosensitive member with a cylindrical supporting member that has a high mechanical strength and is difficult to deform despite a thin and long shape. Glass fibers of about 20 micro meters in diameter and about 3 mm in length are preferable due to the lack of adverse effects on the surface roughness of the supporting member. The addition of various materials does not affect the favorable characteristics of the supporting member as long as at least 40 wt. % or more of the supporting member material is formed of a cross-linking type PPS resin.

Irradiating the surface of the supporting member with ultraviolet rays of 180 to 255 nm in wavelength or inducing corona discharge thereon serves to provide a long life organic photosensitive member with a cylindrical supporting member that has a better adhesion and on which an organic material layer can be formed stably.

The above cylindrical supporting member can be manufactured efficiently by injection-molding a material of $10^4$ ohm·cm in volume resistivity formed by blending a cross-linking type PPS resin as a main component with a highly conductive carbon black of $10^{-1}$ ohm·cm or less in volume resistivity, or the above material wherein the average particle diameter of the carbon black is 20 to 50 nm, or to which glass fibers are added.

The above molding material can be molded effectively and the cross-linking type PPS resin is crystallized sufficiently to act favorably for the supporting member when the mold temperature is within a range of 120° to 150° C. and the molding material temperature is within a range of 280° to 330° C. Completion of filling of the material in preferably 0.5 to 2.5 second serves to form efficiently a thin and long cylindrical supporting member.

In the metal mold used, the core mold fitted into the fixed mold is finished to have a surface roughness of 1 micro meter or less at the maximum height (Rmax) and a draft angle of 0.15 to 0.25 degree on one side. The inner surface of the cavity mold does not have a draft angle and is electro-formed with a nickel alloy to be finished to have a surface roughness of 1 micro meter or less at the maximum height (Rmax). The cavity mold has at an inside of an end face contacting the fixed mold a step section, through which a material is filled by a side gate method. The fixed mold is provided with at least three spring knocks at the end face opposite to the end face of the cavity mold to ensure that when the mold is opened after molding, the injection-molded product remains in the cavity mold due to the effect of the spring knock.

The use of the metal mold as stated above serves to easily reduce the molding material filling time down to 0.5 second to allow the molding material to be uniformly filled circumferentially up to the tip of the cavity before the material starts to solidify. Thus, it is possible to make the thin and long supporting members adequately. The supporting members of 1 micro meter in surface roughness at the maximum height (Rmax) can also be obtained corresponding to the roughness of the inner surface of the cavity mold. When the mold is opened after the injection-molding, the core mold can be pulled out smoothly from the molded product due to its draft angle, which can then be, for example, knocked out from the cavity mold without damaging the surface thereof.

What is claimed is:

1. An electrophotographic organic photosensitive member comprising, a cylindrical supporting member formed of a material of $10^4$ ohm·cm in volume resistivity containing a cross-linked polyphenylenesulfide resin as a main component, and a highly conductive carbon black of $10^{-1}$ ohm·cm or less in volume resistivity, an amount of the cross-linked polyphenylenesulfide resin contained in the cylindrical supporting member being at least 40 wt % to provide dimensional accuracy and an average particle diameter of the carbon black contained in the cylindrical supporting member being 20 to 50 nm, and an organic photosensitive layer formed on an outer surface of the cylindrical supporting member.

2. An electrophotographic organic photosensitive member of claim 1, wherein the cylindrical supporting member contains a carbon black dispersant.

3. An electrophotographic organic photosensitive member of claim 2, wherein the dispersant is selected from the group consisting of calcium carbonate and clay.

4. An electrophotographic organic photosensitive member of claim 2, wherein the cylindrical supporting member contains glass fibers as a reinforcement.

5. An electrophotographic organic photosensitive member of claim 1, wherein the thickness of the cylindrical supporting member is 3 mm or less.

6. An electrophotographic organic photosensitive member of claim 1, wherein an amount of the carbon black contained in the cylindrical supporting member is less than 20 wt %.

7. An electrophotographic organic photosensitive member of claim 6, wherein a surface roughness of the cylindrical supporting member is 0.5–1.2 μm.

8. An electrophotographic organic photosensitive member formed by steps of:

preparing a cylindrical supporting member formed of a material of $10^4$ ohm·cm in volume resistivity containing a cross-linked polyphenylenesulfide resin as a main component, and a highly conductive carbon black of $10^{-1}$ ohm·cm or less in volume resistivity, an amount of the cross-linked polyphenylenesulfide resin contained in the cylindrical supporting member being at least 40 wt % to provide dimensional accuracy, an amount of the carbon black contained in the cylindrical supporting member being less than 20 wt %, and an average particle diameter of the carbon black contained in the cylindrical supporting member being 20 to 50 nm so that a surface roughness of the cylindrical supporting member is 0.5–1.2 μm, irradiating ultraviolet rays of 180 to 255 nm in wavelength on an outer surface of the cylindrical supporting member, and forming an organic photosensitive layer on the outer surface of the cylindrical supporting member.

9. An electrophotographic organic photosensitive member formed by steps of:

preparing a cylindrical supporting member formed of a material of $10^4$ ohm·cm in volume resistivity containing a cross-linked polyphenylenesulfide resin as a main component, and a highly conductive carbon black of $10^{-1}$ ohm·cm or less in volume resistivity, an amount of the cross-linked polyphenylenesulfide resin contained in the cylindrical supporting member being at least 40 wt % to provide dimensional accuracy, an amount of the carbon black contained in the cylindrical supporting member being less than 20 wt %, and an average particle diameter of the carbon black contained in the cylindrical supporting member being 20 to 50 nm so that a surface roughness of the cylindrical supporting member is 0.5–1.2 μm, inducing corona discharge treatment on an outer surface of the cylindrical supporting member, and forming an organic photosensitive layer on the outer surface of the cylindrical supporting member.

* * * * *